US012304044B2

(12) United States Patent
Kuriki et al.

(10) Patent No.: US 12,304,044 B2
(45) Date of Patent: May 20, 2025

(54) DRIVING TOOL

(71) Applicant: MAKITA CORPORATION, Anjo (JP)

(72) Inventors: Shun Kuriki, Anjo (JP); Kiyonobu Yoshikane, Anjo (JP); Masaya Nagao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 68 days.

(21) Appl. No.: 18/220,361

(22) Filed: Jul. 11, 2023

(65) Prior Publication Data

US 2024/0051103 A1 Feb. 15, 2024

(30) Foreign Application Priority Data

Aug. 9, 2022 (JP) ................................ 2022-126920

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .................................. B25C 1/047; B25C 1/06
See application file for complete search history.

(56) References Cited

U.S. PATENT DOCUMENTS 3,056,137 A * 10/1962 Wandel ..................... B25C 5/16 227/127
3,774,293 A * 11/1973 Golsch .................... B25C 1/008 227/66
4,187,589 A * 2/1980 Jobe, II ................. B25C 5/1665 227/66
5,231,750 A * 8/1993 Fealey .................... B25C 1/047 173/127
7,905,378 B2 * 3/2011 Liang ...................... B25C 1/044 227/8
10,821,586 B2 * 11/2020 Wu ......................... B25C 1/047
11,904,447 B2 * 2/2024 Baba ....................... B25C 1/047
11,945,083 B2 * 4/2024 Fujimoto .................. B25C 1/06
12,076,844 B2 * 9/2024 Carrier .................... B25C 1/045
2019/0126453 A1 * 5/2019 Po .......................... B25C 1/047
2019/0143498 A1 * 5/2019 Weber ..................... B25C 1/005 227/140
2019/0375084 A1 * 12/2019 Bierdeman ............. B25C 1/047
2021/0101272 A1 * 4/2021 Saitou ..................... B25C 1/047
2021/0291335 A1 * 9/2021 Liu ......................... B25C 1/047
2021/0299835 A1 * 9/2021 Ward ....................... B25C 1/043

(Continued)

FOREIGN PATENT DOCUMENTS

JP 6915682 B2 8/2021

*Primary Examiner* — Lucas E. A. Palmer
(74) *Attorney, Agent, or Firm* — Oliff PLC

(57) ABSTRACT

A driving tool for improving shock absorbability and durability of a tubular damper, the driving tool comprising a cylinder and a piston that moves inside the cylinder owing to a gas pressure. The driving tool further comprises a driver main body to drive a driving member by moving integrally with the piston, and a lift mechanism having a wheel for the driver main body to return to original position. The driver main body is arranged such that a width center line of the driver main body is offset in a direction away from the lift mechanism with respect to a width center line of the piston.

20 Claims, 8 Drawing Sheets

(56) References Cited

U.S. PATENT DOCUMENTS

| | | | | |
|---|---|---|---|---|
| 2022/0134524 | A1* | 5/2022 | Shioya | B25C 1/04<br>227/130 |
| 2022/0234184 | A1* | 7/2022 | Weber | B25C 1/06 |
| 2022/0250222 | A1* | 8/2022 | Garces | B25C 1/047 |
| 2023/0050091 | A1 | 2/2023 | Saitou et al. | |
| 2023/0202011 | A1* | 6/2023 | Bierdeman | B25C 1/047<br>227/140 |
| 2024/0017387 | A1* | 1/2024 | McCardle | B25C 1/041 |
| 2024/0181616 | A1* | 6/2024 | Yoshikane | B25C 1/06 |

* cited by examiner

DRIVING TOOL

CROSS-REFERENCE

This application claims priority to Japanese patent application serial number 2022-126920, filed on Aug. 9, 2022, the contents of which are incorporated herein by reference in their entirety for all purposes.

TECHNICAL FIELD

The present disclosure generally relates to a driving tool for driving a material, such as a nail or a staple, into a workpiece, such as, for example, a wooden material.

BACKGROUND ART

For example, a gas-spring type driving tool that utilizes a thrust power of compressed air as a driving force is known. The gas-spring type driving tool may include a piston that moves in an up-down direction within a cylinder and a driver main body that extends downward from the piston. The driver main body may move integrally with the piston in the up-down direction for driving a driving member. The piston and the driver main body may move downward in a driving direction owing to a pressure of the gas filled in an accumulation chamber. The driver main body may drive a driving member that is supplied to a driving passage from a magazine within which a plurality of driving members are loaded. The driving member may be driven into a workpiece, such as, for example, a wooden material.

The gas-spring type driving tool may include a lift mechanism. The lift mechanism may move the piston and the driver main body in an upward direction from a lower end position to an initial position and from the initial position to an upper end position. The driver main body may include a plurality of driving projections (rack teeth) that are arranged along a longitudinal direction of the driver main body. The lift mechanism may include a wheel that includes a plurality of engaging portions (pins), each of which successively engages a corresponding driving projection of the driver main body. The plurality of engaging portions may be arranged along an outer periphery of the wheel. The wheel may be rotated by, for example, an electric motor serving as a driving source. After the driving member has been driven, each of the plurality of engaging portions which are rotated integrally with the wheel around a rotation axis of the wheel may successively engage a corresponding driving projection of the driver main body, thereby moving the driver main body and the piston upward in a direction opposite to the driving direction. By the upward movement of the piston, the gas pressure in the accumulation chamber may increase. After the driver main body has reached an upper end position, an engagement state of a lowermost driving projection of the driver main body with respect to a corresponding engaging portion of the wheel may be released. A driving operation of the driver main body therefore may be performed repeatedly.

The plurality of driving projections may project in a direction from the driver main body toward a side of the lift mechanism. The driver main body may be configured such that a width center of the driver main body in a left-right direction is arranged to be coaxial to an axis center of the piston. Therefore, a length from a tip end of the driving projection of the driver main body to the axis center of the piston may be longer than a length from an end surface of the driver main body on a side opposite to lift mechanism to the axial center of the piston.

A damper (cushion) may be arranged on a lower side of the cylinder so as to absorb an impact of the piston that moves downward to the lower end position. The damper that is formed approximately in a tubular shape and centered at the axis center of the piston contacts a lower surface of the piston equally. A volume of the damper may be arranged equally in the left-right direction (horizontal direction) with respect to the axis center of the piston. A through hole therefore may be formed at a center of the damper such that the driver main body and the plurality of driving projections of the driver main body may pass through the through hole. This through hole may have a diameter such that the damper does not contact the driver main body and the plurality of driving projections, and that the diameter may be based on a length from the tip end of the driving projection to the axis center of the piston. To increase the volume of the damper without changing the diameter of the through hole, a size of the driving tool must increase. A limitation therefore exists for increasing the volume of the damper that contacts the piston at the lower surface.

Thus, there is a need for a driving tool for increasing the volume of the damper that contacts the piston without increasing the driving tool size, and therefore improving shock absorbability and durability of the damper.

SUMMARY

According to one feature of the present disclosure, a driving tool comprises a cylinder and a piston that moves in the cylinder owing to a gas pressure. The driving tool also comprises a driver main body that moves integrally with the piston for driving a driving member. The driving tool also comprises a plurality of driving projections that project from the driver main body in a width direction of the driver main body, in which the plurality of driving projections are arranged along a side edge of the driver main body in a longitudinal direction of the driver main body. The driving tool also comprises a lift mechanism that includes a wheel having a plurality of engaging portions, which engage a corresponding driving projection, and the lift mechanism is configured for the driver main body to return to an initial position by rotating the wheel. The driving tool also comprises a tubular damper for receiving an impact of the piston, wherein the damper having a through hole through for the driver main body and the driving projections passing through. The driver main body is arranged such that a width center of the driver main body is offset in a direction away from the lift mechanism with respect to a width center line of the piston.

Because of this configuration, a length between a tip end of the driving projection and the width center line of the piston in the left-right direction can be shortened by such a distance that the width center line of the driver main body is offset with respect to the width center line of the piston. Accordingly, an opening area of the through hole can be reduced; therefore, increasing the volume of the damper that contacts the damper-receiving surface of the piston, and improving shock absorbability of the damper. Further, the durability of the damper and the piston that contact to each other will be improved.

DETAILED DESCRIPTION

Figure 1:
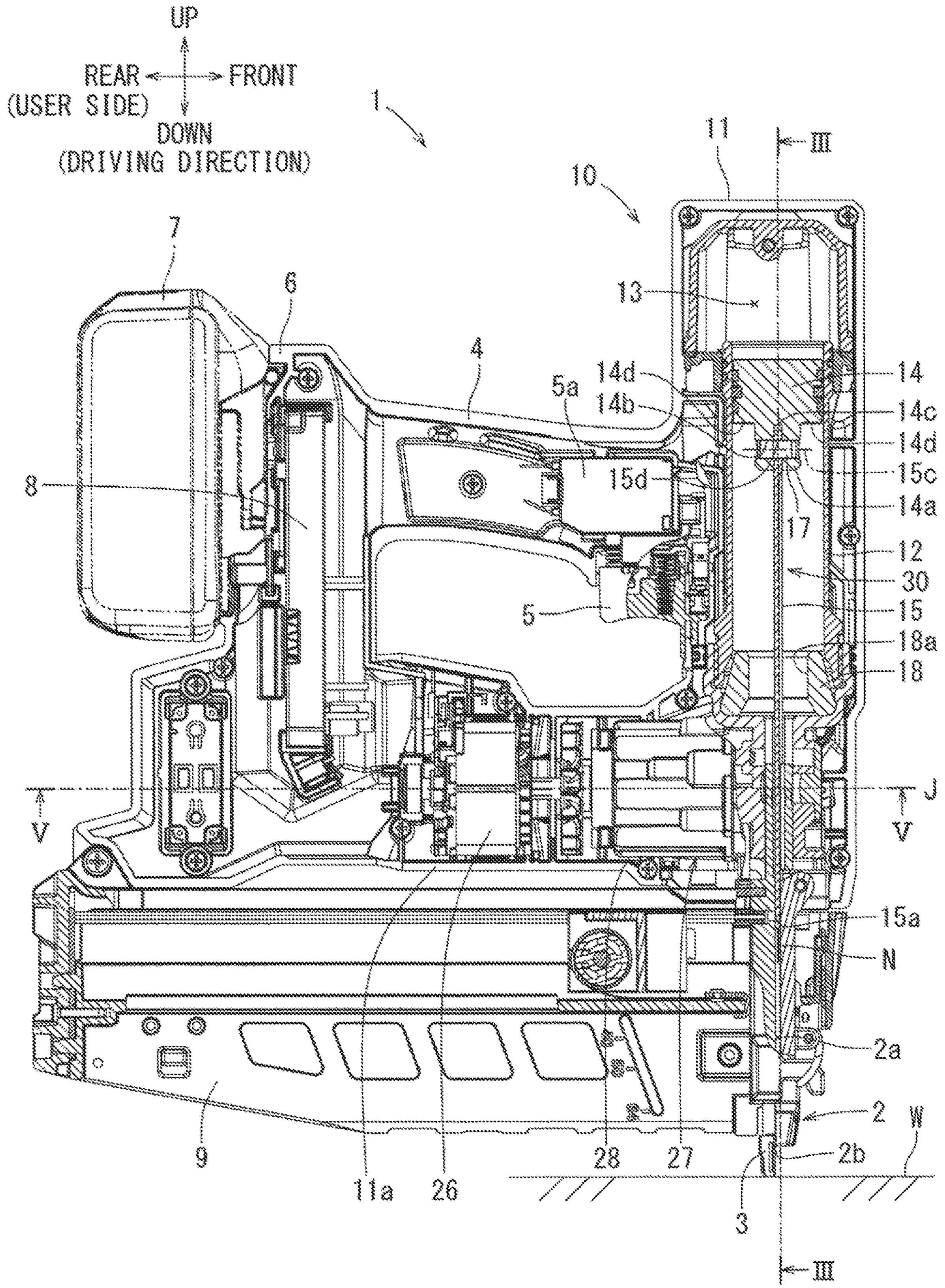
FIG. 1 is a longitudinal cross-sectional view of a driving tool according to an embodiment of the present disclosure, showing a state in which a piston and a driver of the driving tool are at an initial position.

The detailed description set forth below, when considered with the appended drawings, is intended to be a description of exemplary embodiments of the present disclosure and is not intended to be restrictive and/or to represent the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another feature of the present disclosure, the driver main body connected to the piston is swingable in a width direction of the driver main body, in which the driver main body is swingable around a connection portion of the driver main body and connected to the piston within a predetermined angle range in the width direction of the driver main body. By swinging in the width direction, the driver main body will not slide the driving nose that guides the driver main body. Hence, an accidental force will be restrained from applying to the driver main body, thereby suppressing wear of the driver main body.

According to another feature of the present disclosure, the driver main body is arranged such that a swing center of the driver main body with respect to the piston is on the width center line of the piston. Because of this configuration, the driver main body is swingable with respect to the width center line of the piston uniformly in the width direction of the driver main body. The damper is arranged approximately uniformly around the width center line of the piston such that the damper uniformly contacts the damper-receiving surface of the piston. Accordingly, the driver main body can be swingable approximately uniformly in the width direction of the driver main body with respect to the center of the damper. As a result, when the driver main body swings in the width direction of the driver main body, the driver main body and accordingly the driving projection can be prevented from accidentally contacting the inner circumferential surface of the damper.

According to another feature of the present disclosure, the driving tool further comprises a driver guide on a lower side in a driving direction, the driver guide configured to guide the driver main body. The driver guide is arranged such that a width line of the driver guide is offset in a direction away from the lift mechanism with respect to the width center line of the piston. Because of this configuration, the driver main body is movable in the driving direction such that the width center line of the driver main body is on the width center line of the driver guide. The driving member is supplied on the width center line of the driver guide. Accordingly, the driver main body can drive approximately a center of the driving member in the width direction of the driving member. As a result, the driving member can be ejected straight in the driving direction.

According to another feature of the present disclosure, an inner circumferential surface of the damper is in a circular shape viewed from a movement direction of the driver main body. Because of this configuration, the piston contacts the damper approximately uniformly in a circumferential direction. When the damper receives an impact from the piston, the damper is deformed approximately uniformly in the circumferential direction. As a result, a specific portion of the damper can be suppressed from wearing, thereby improving durability of the damper. Also, when the piston contacts the damper, the piston can be prevented from accidentally tilting, thereby suppressing both the piston and the cylinder from wearing.

According to another feature of the present disclosure, the lift mechanism includes the wheel that is rotatably supported by the tool main body and the plurality of engaging portions arranged along a circumferential direction of the wheel. The wheel is configured to be movable in a radial direction of the wheel such that at least one of the plurality of engaging portions is moved away from the driver main body.

Because of the above configuration, a projecting length of the driving projection in the width direction is required to be longer by a length such that the engaging portion is movable in the radial direction of the wheel. By the configuration in which the width center line of the driver main body is arranged to be offset in the leftward direction so as to be away from the lift mechanism with respect to the width center line of the piston, a volume of the damper can be suppressed from decreasing in a case where a projecting length of the driving projection is required longer. Also, the wheel and accordingly the engaging portions can be positioned nearer to the width center line of the piston by such a length that the width center line of the driver main body is offset with respect to the width center line of the piston. Accordingly, an upward pressing force applied to a bottom portion of the driving projection, which is caused by the engaging portion, can act near to the width center line of the piston. As a result, the driver and the piston can be moved straight upward.

According to another feature of the present disclosure, the driver main body includes a first protrusion on each side of a width direction of the driver main body, each first protrusion protruding in a height direction perpendicular to both a moving direction of the driver main body and the width direction of the driver main body. Because of this configuration, the driver main body can be guided along the first protrusions, thereby being moved straight in the driving direction. As a result, the driver main body can stably drive the driving member straight in the driving direction in an improved manner.

According to another feature of the present disclosure, the driver main body includes a second protrusion in the height direction in a middle of the width direction of the driver main body, a protrusion length of the second protrusion being smaller than that of the each first protrusion. By suppressing the height of the second protrusion, the driver main body can be made lighter. The driver main body drives the driving member at the tip end surface formed at a lower end of the second protrusion of the driver main body. By providing the second protrusion such that the protrusion length of the second protrusion is formed to have a predetermined length, the driving member driven by the driver main body can be properly ejected in a stable manner.

Next, an embodiment according to the present disclosure will be described with reference to FIGS. 1 to 8. FIG. 1 shows an example of a driving tool 1. The driving tool 1 of FIG. 1 is, for example, a gas-spring type driving tool 1 that utilizes a pressure of a gas filled in a chamber above a cylinder 12 as a thrust power for driving a driving member N. In the following explanation, a driving direction of the driving member N is a downward direction, and a direction opposite to the driving direction is an upward direction. In FIG. 1, a user of the driving tool 1 may be generally situated on a rear side of the driving tool 1. The rear side of the driving tool 1 may also referred to as a user side, and a side in a forward direction may be referred to as a front side. A left and right side may be based on a user's position when situated on the rear side of the driving tool 1.

Figure 3:
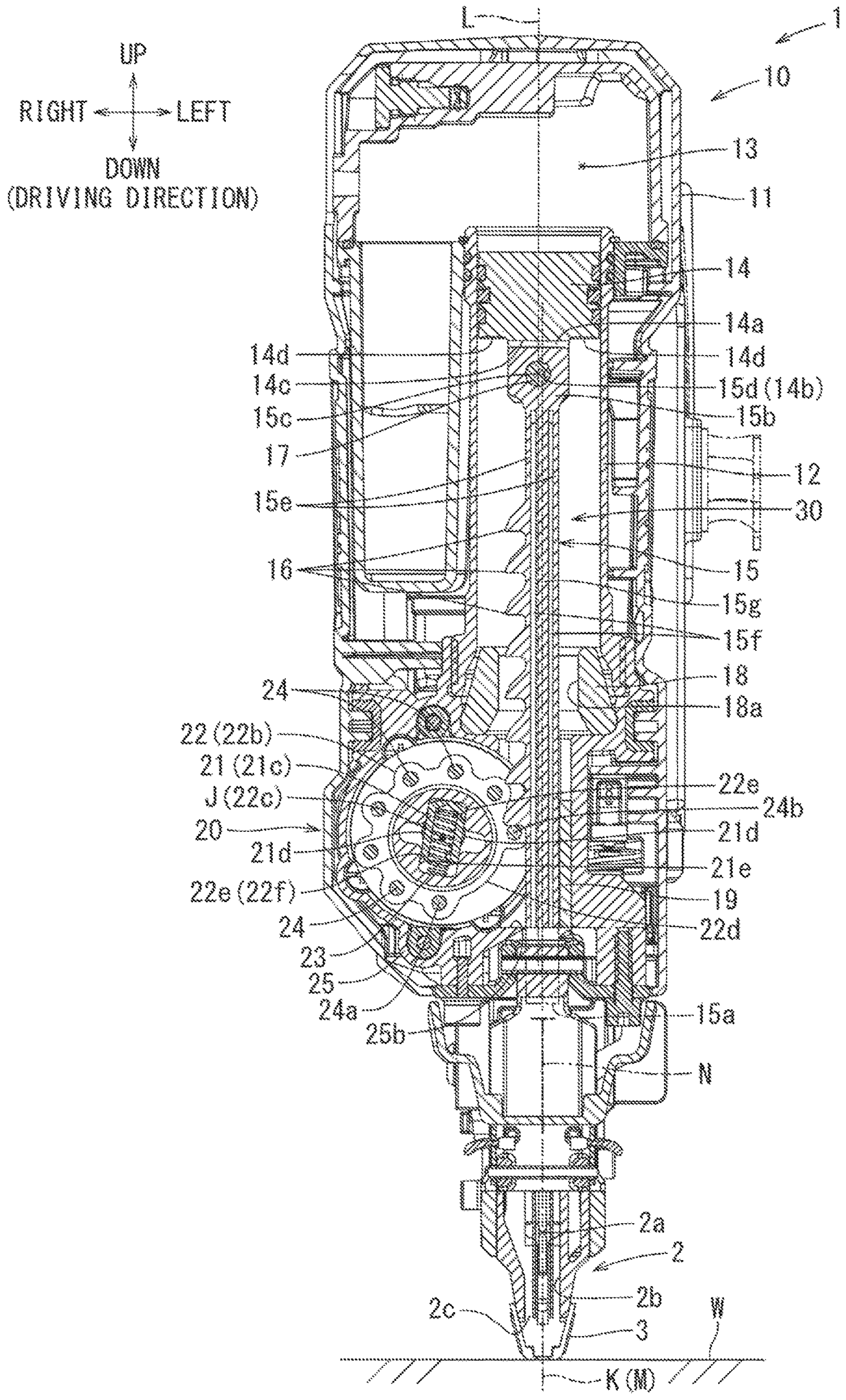
FIG. 3 is a cross-sectional view taken along line III-III of FIG. 1.

As shown in FIGS. 1 and 3, the driving tool 1 may include a tool main body 10. The tool main body 10 may be configured to include a cylinder 12 that is housed in a tubular main body housing 11. A piston 14 may be housed within the cylinder 12, so as to be able to be reciprocated in an up-down direction. An upper portion of the cylinder 12, which is a portion that is above the piston 14, may communicate with an accumulation chamber 13. A compressible gas such as, for example, air may be filled in the accumulation chamber 13. A pressure of the gas filled in the accumulation chamber 13 may act on an upper surface of the piston 14, thereby providing a thrust power for a driving operation.

Figure 4:
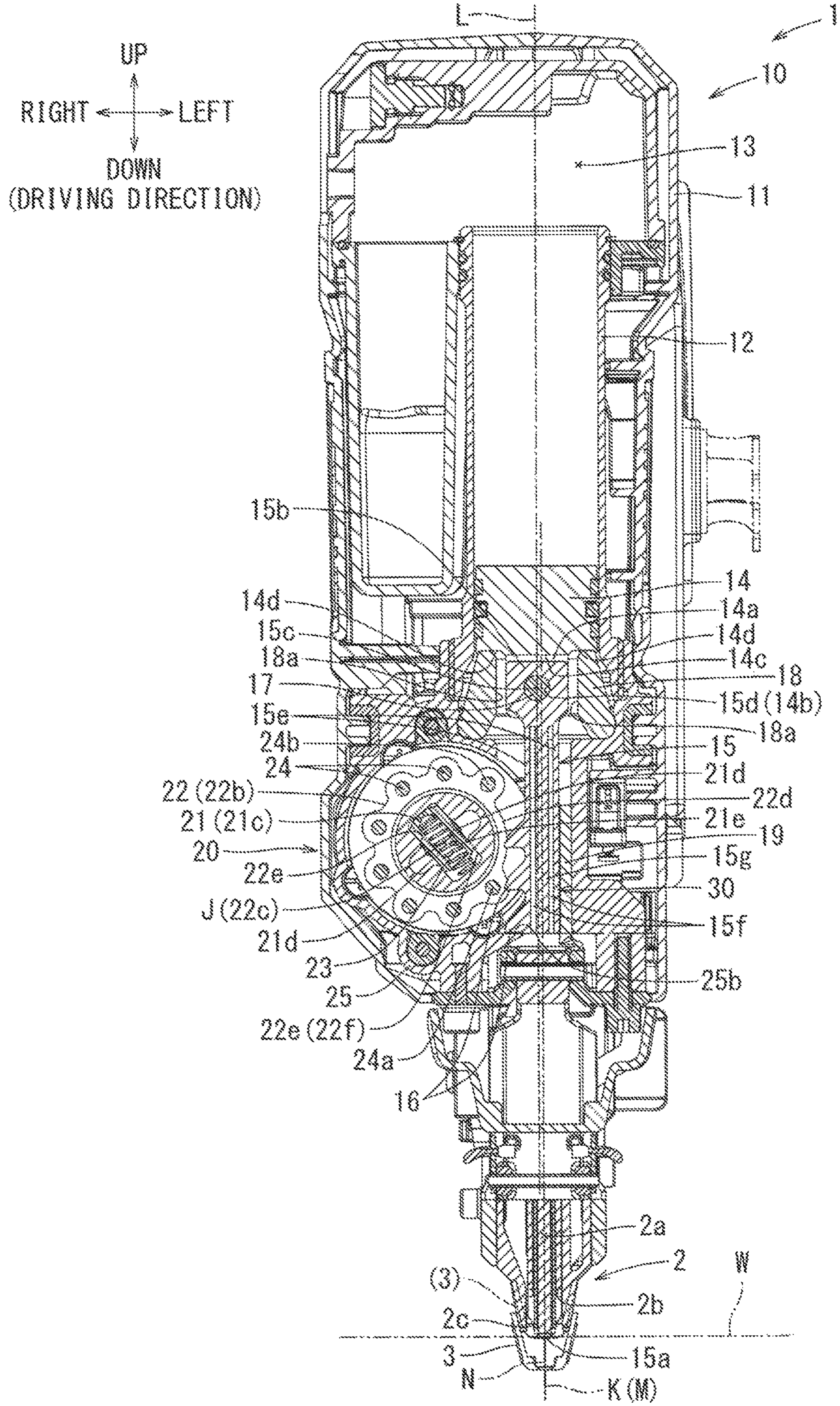
FIG. 4 is a cross-sectional view taken along line IV-IV of FIG. 2.

As shown in FIGS. 3 and 4, a lower portion of the cylinder 12 may communicate with a driving passage 2*a* of a driving nose 2. The driving nose 2 may be provided at a lower portion of the tool main body 10. A magazine 9, within which a plurality of driving member N (refer to FIG. 1) can be loaded, may be linked to the driving nose 2. The plurality of driving member N may be supplied from within the magazine 9 to the driving passage 2*a* one by one. A contact arm 3 may be arranged at a lower portion of the driving nose 2. The contact arm 3 may be slidable in the up-down direction. The contact arm 3 may move upward when the contact arm 3 is pressed against a workpiece W, as shown in an imaginary line of FIG. 4.

As shown in FIG. 3, a driver 30 may be connected to a lower portion of the piston 14. A lower portion of the driver 30 may enter a driving passage 2*a* of the driving nose 2. The driver 30 may move downward within the driving passage 2*a* owing to the pressure of the gas filled in the accumulation chamber 13, the gas being configured to act on the upper surface of the piston 14. The driver 30 that moves downward may drive a driving member N that is supplied to the driving passage 2*a*. The driving member N being driven by the driver 30 may be ejected from an ejection port 2*c* of the driving nose 2. The ejection port 2*c* of the driving nose 2 may be open at a lower end of the driving passage 2*a*. The driving member N that is ejected from the ejection port 2*b* may be driven into the workpiece W.

Figure 2:
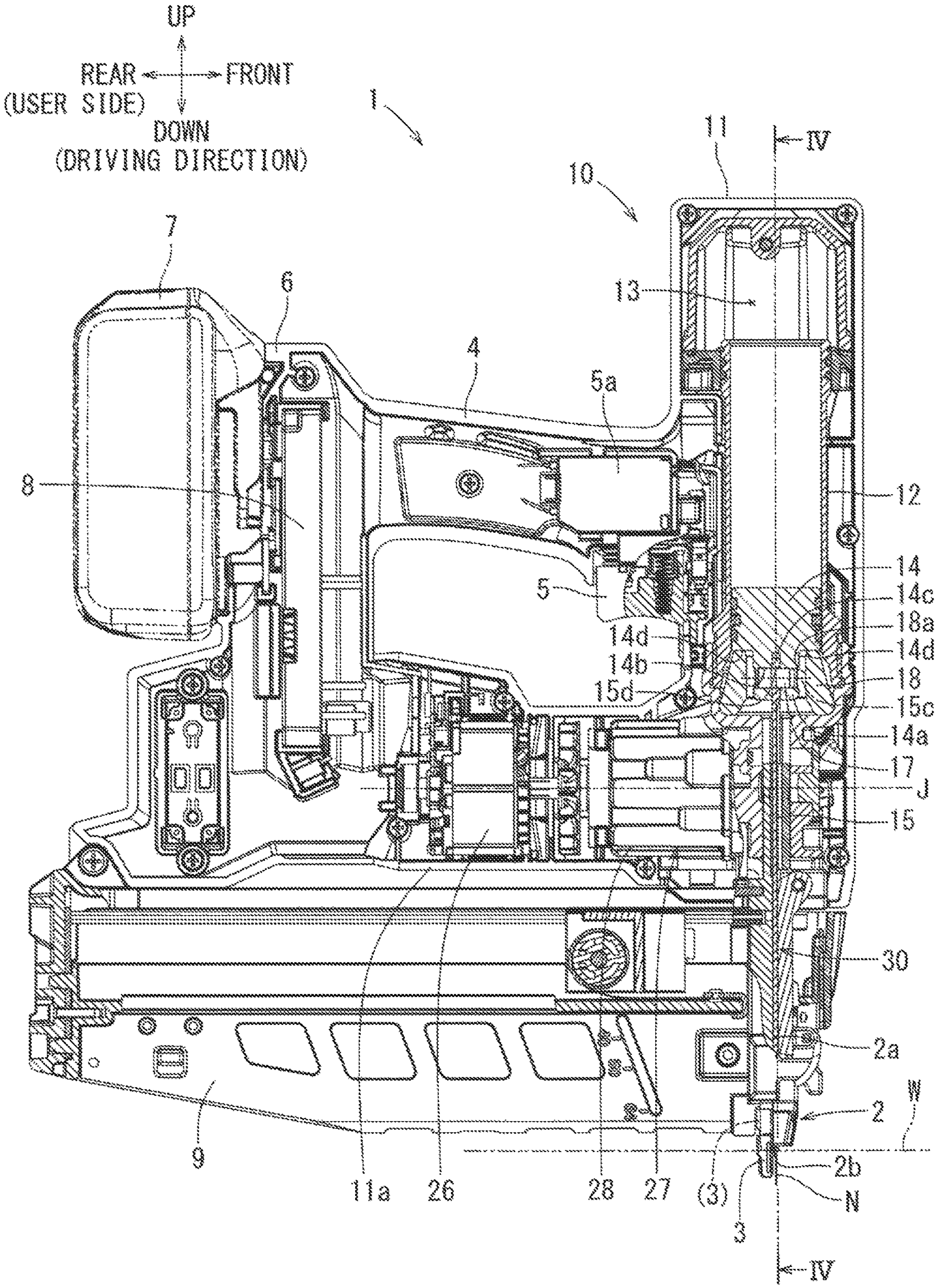
FIG. 2 is a longitudinal cross-sectional view of the driving tool according to the embodiment of the present disclosure, showing a state in which the piston and the driver of the driving tool are at a lower end position.

As shown in FIGS. 1 and 2, a grip 4, which is configured to be held by a user, may be arranged on a rear side of the tool main body 10. A trigger 5, which is configured to be pulled by a fingertip of the user, may be arranged on a lower surface of a front portion of the grip 4. When the contact arm 3 is pushed against the workpiece W so as to move the contact arm 3 relatively upward with respect to the driving nose 2, a pulling operation of the trigger 5 may become effective. A trigger switch 5*a* may be provided in the grip 4 so as to switch on/off a trigger function according to the pulling operation of the trigger 5. A battery attachment portion 6 may be arranged on a rear side of the grip 4. A battery pack 7 may be detachably attached to a rear surface of the battery attachment portion 6. The battery pack 7 may be removed from the battery attachment portion 6 to be repeatedly recharged by a dedicated charger. The battery pack 7 may be used as a power source for various electric tools. The battery pack 7 may serve as a power source for supplying power to a driving unit, an embodiment of which is discussed later in detail.

As shown in FIGS. 1 and 2, a controller 8 that mainly controls a driving of an electric motor 26 may be housed in the grip 4. The controller 8 may be formed such that a control circuit board is housed in a box-shaped rectangular case. The controller 8 may be housed in front of the battery attachment portion 6 such that a width direction (a shortest side) of the case is directed to a front-rear direction.

As shown in FIGS. 3 and 4, a lift mechanism 20 may be linked to a right side of the driving nose 2. The lift mechanism 20 may return the driver 30, and accordingly the piston 14, upward after a driving operation has been completed. The pressure of the gas in the accumulation chamber 13 may increase owing to an upward movement of the piston 14 by the lift mechanism 20.

Figure 5:
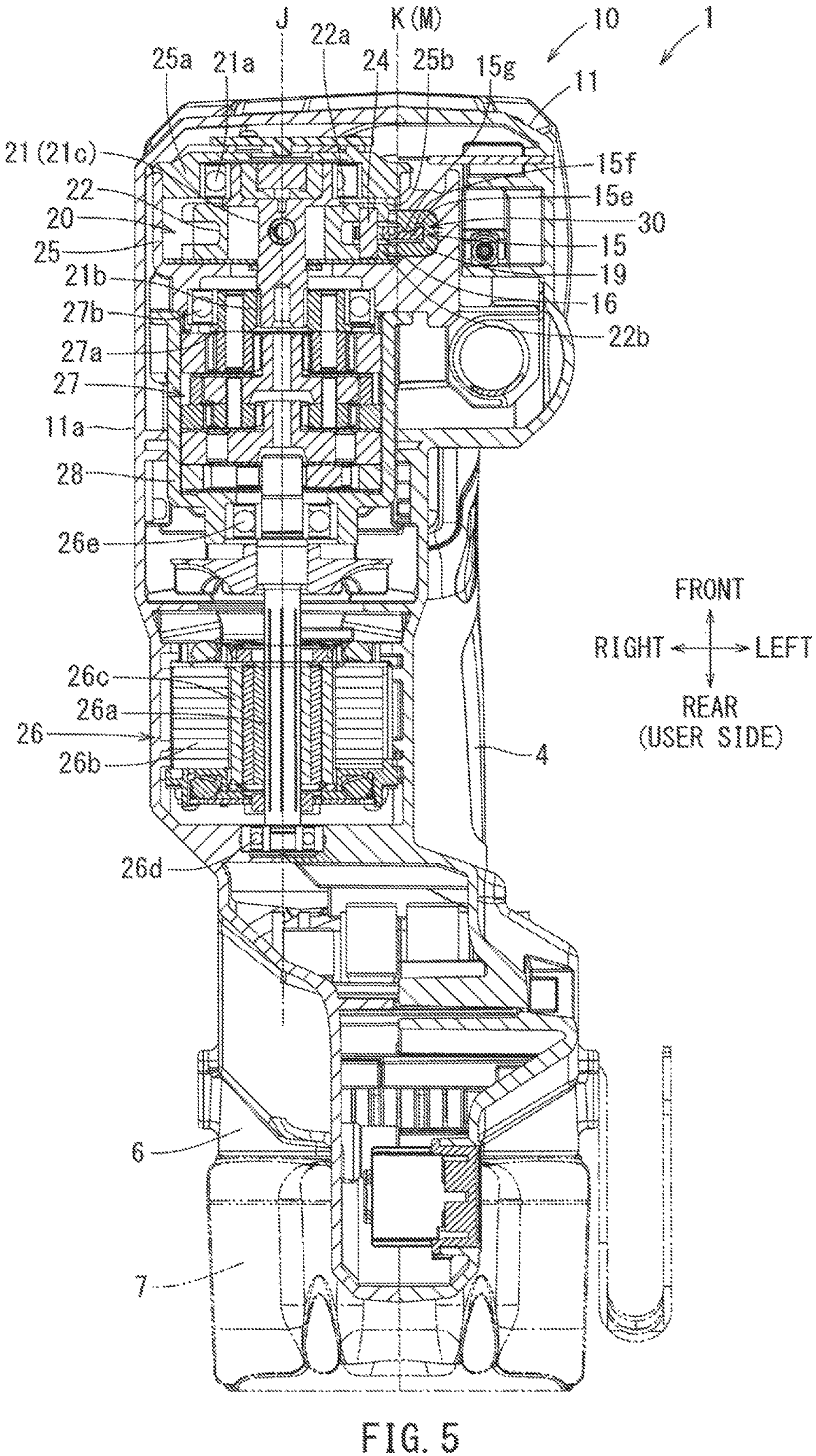
FIG. 5 is a cross-sectional view taken along line V-V of FIG. 1.

As shown in FIG. 5, the electric motor 26 and a reduction gear train 27 for driving the lift mechanism 20 may be arranged on a rear side of the lift mechanism 20. The electric motor 26, the reduction gear train 27 and the lift mechanism 20 may be housed in approximately a tubular-shaped driving unit case 11*a*. The driving unit case 11*a* may link a lower portion of the main body housing 11 to a lower portion of the battery attachment portion 6 (refer to FIG. 1). The driving unit case 11*a* may be integrally formed with the main body housing 11.

As shown in FIG. 5, the electric motor 26 may be housed in the driving unit case 11*a* such that an axis line J of an output shaft 26*a* of the electric motor 26 extends in a front-rear direction perpendicular to a driving direction (a direction perpendicular to a paper surface of FIG. 5). A rotor 26*c* of the electric motor 26 may be attached to the output shaft 26*a* so as to be integrally rotatable with the output shaft 26*a*. A stator 26*b* of the electric motor 26 may be disposed radially outward of the rotor 26*c* and unrotatably supported on an inner circumferential surface of the driving unit case 11*a*. The output shaft 26*a* of the electric motor 26 may be rotatably supported by the driving unit case 11*a* via bearings 26*d*, 26*e*. The battery pack 7 may serve as a power source for the electric motor 26. The electric motor 26 may be activated by a pull operation of the trigger 5 or any other suitable operation.

As shown in FIG. 5, a front portion of the output shaft 26*a* may be connected to a reduction gear train 27. The reduction gear train 27 may be supported on an inner peripheral side of approximately a tubular-shaped gear train case 28 that is housed within the driving unit case 11*a*. A three-staged gear train may be used for the reduction gear train 27. The three-staged gear train may be arranged coaxial to each other, and may be arranged coaxial with the motor axis line J. A rotation output of the electric motor 31 may be output to the lift mechanism 20, for instance, after being reduced by the reduction gear train 27.

As shown in FIG. 5, the lift mechanism 20 may include a shaft member 21 that is connected to the reduction gear train 27. The lift mechanism 20 may also include a wheel 22 that is supported by the shaft member 21. The lift mechanism 20 may be housed within approximately a tubular-shaped mechanism case 25, which is housed within the driving unit case 11*a*. A rotation axis of the shaft member 21 may be aligned with the motor axis line J. A front portion of the mechanism case 25 may be covered with a cover 25*a*. A front end of the shaft member 21 may be rotatably supported by a bearing 21*a* that is attached to an inner surface of the cover 25*a*. A connection member 21*b* at a rear end of the shaft member 21 may be integrally linked to a final stage carrier 27*a* of the reduction gear train 27. The final stage carrier 27*a* of the reduction gear train 27 may be rotatably supported by the mechanism case 25 via a bearing 27*b* that is arranged on an outer peripheral side of the final stage carrier 27*a*. When the electric motor 26 is activated, the shaft member 21 and the wheel 22 of the lift mechanism 20 may integrally rotate in a counterclockwise direction in FIG. 3.

As shown in FIGS. 3 to 5, a supporting member 21*c* for supporting the wheel 22 may be disposed in a center part of the shaft member 21 in a front-rear direction. The supporting member 21*c* may be formed in approximately a cylindrical shape. The supporting member 21*c* may include a pair of supporting surfaces 21*d* parallel to each other (a flat part in its width direction) and extending in a radial direction of the supporting member 21*c*. The supporting member 21*c* may also include a spring housing portion 21*e* between the pair of the supporting surfaces 21*d*. The spring housing portion 21*e* may be recessed along the pair of the supporting surfaces 21*b*. A compression spring 23 for biasing the wheel 22 in a radial direction of the wheel 22 may be housed in the spring housing portion 21*e*.

As shown in FIGS. 3 and 4, the wheel 22 may include, around a center thereof, a mounting hole 22*f* through which the supporting member 21*c* of the shaft member 21 can be inserted. A pair of slide surfaces 22*e* may be formed on an inner wall surface of the mounting hole 22*f*, so as to be parallel to each other and to extend in the radial direction of the wheel 22. A distance between the pair of the slide surfaces 22*e* may be approximately the same as that between the pair of the supporting surfaces 21*d* of the supporting member 21*c*. When the supporting member 21*c* is inserted into the mounting hole 22*f*, each of the slide surfaces 22*e* may face and contact a corresponding supporting surface 21*d*. The pair of slide surfaces 22*e* may be configured to slidably contact the pair of supporting surfaces 21*d*, such that the wheel 22 may move in the radial direction of the shaft member 21 within a predetermined range.

FIGS. 3 and 4 shows that the wheel 22 is disposed in an initial position where a center 22*c* of the wheel 22 is on the motor axis line J around which the shaft member 21 rotates. The wheel 22 may be spring biased toward the initial position with respect to the shaft member 21 by a compression spring 23. The wheel 22 may be configured to slidably move to an eccentric position against a biasing force of the compression spring 23 such that the center 22*c* of the wheel 22 is far from the motor axis line J. For example, when an engaging portion 24 is pushed by a corresponding driving projection 16, which is discussed later in detail, the wheel 22 that supports the engaging portion 24 may move in a radial direction of the wheel 22 from the initial position toward the eccentric position along the slide surfaces 22*e* and the supporting surfaces 21*d*.

As shown in FIGS. 3 and 4, a plurality of engaging portions 24 may be disposed along an outer periphery of the wheel 22. In the present embodiment, for example, ten engaging portions 24 may be provided. Each of the plurality of engaging portions 24 may be a shaft member (pin) formed in a cylindrical shape. The plurality of engaging portions 24 may be arranged at predetermined intervals in a circumferential direction of the wheel 22. The engaging portions 24 may be absent from an area spanning approximately one fourths of the wheel 22 between a first engaging portion 24*a* and a last engaging portion 24*b*, which may be referred to as a recessed portion 22*d*. A left portion of the wheel 22 may enter the driving passage 2*a* through a window 25*b* formed in the mechanism case 25. Each of the engaging portions 24 of the wheel 22 that enters the driving passage 2*a* may be configured to engage a bottom portion of one of the driving projections 16 of a driver 30, which is discussed later in detail. When the wheel 22 rotates in a counterclockwise direction in FIGS. 3 and 4 while each of the engaging portions 24 engages a bottom portion of a corresponding driving projection 16, the driver 30 and the piston 14 may move upward.

As shown in FIG. 5, the wheel 22 may include a front flange 22*a* and a rear flange 22*b* in the front-rear direction. The front flange 22*a* and the rear flange 22*b* may be parallel to each other and may be spaced apart by a predetermined length. The front flange 22*a* and the rear flange 22*b* may be formed such that a configuration of the front flange 22*a* extending in the radial direction is the same or substantially the same as that of the rear flange 22*b*. Each of the engaging portions 24 may be retained at a predetermined position in a circumferential direction of the wheel 22 by a corresponding through hole 22*e* and groove 22*f* respectively formed in the front flange 22*a* and the rear flange 22*b*. Each of the engaging portions 24 may be supported by the wheel 22, so as to be rotatable around a center axis of each corresponding engaging portion 24.

Figure 6:
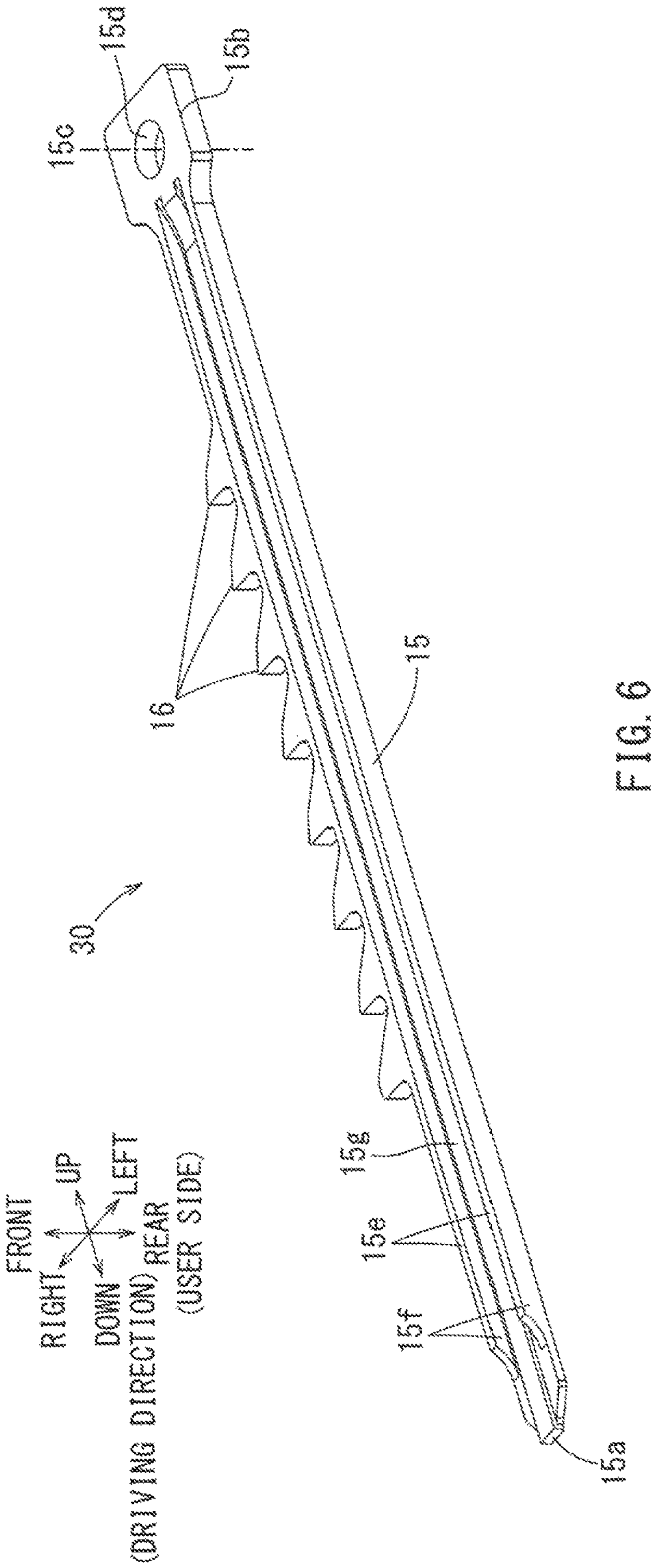
FIG. 6 is a perspective view of the driver.
Figure 7:
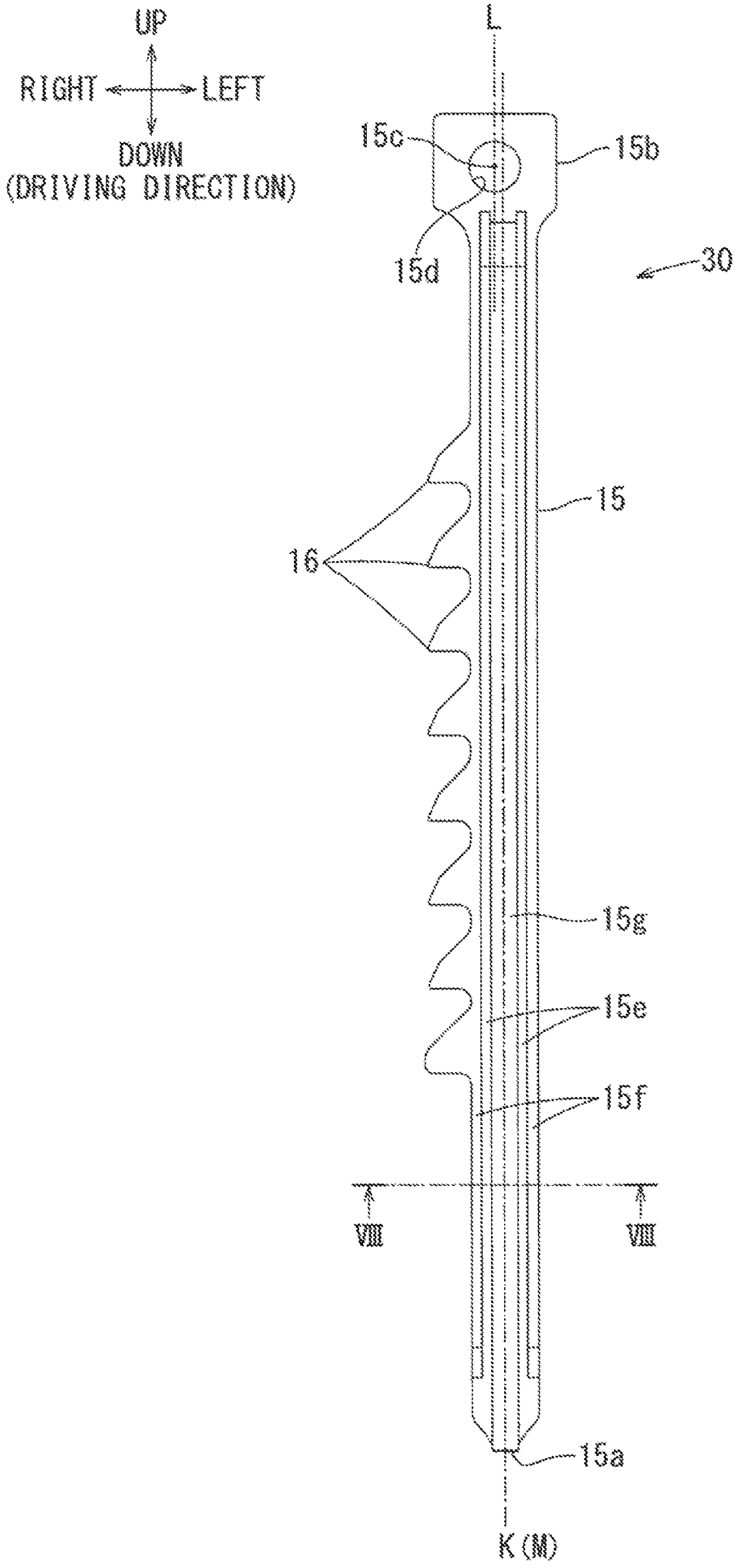
FIG. 7 is a front view of the driver.

As shown in FIGS. 3, 6 and 7, the driver 30 may include a driver main body 15 having a longitudinal direction and a plurality of driving projections 16 each of which has a rack tooth shape and extends from a right side of the driver main body 15 in a rightward direction. In the present embodiment, eight driving projections 16 may be arranged along the longitudinal direction of the driver main body 15. Each of the driving projections 16 may be formed such that a bottom portion of the driving projection 16 faces downward. Also, each of the driving projections 16 may have approximately a triangular shape viewed from a front-rear direction. The plurality of the driving projections 16 may be formed at predetermined intervals in the up-down direction. Also, the plurality of driving projections 16 may be configured to have approximately the same length in the left-right direction. A bottom portion of each of the plurality of driving projections 16 may engage one of the engaging portions 24.

As shown in FIGS. 3, 6 and 7, the driver main body 15 may include a pair of first protrusions 15*e* that protrude in a forward direction from the driver main body 15. The driver main body 15 may also include a second protrusion 15*g* that protrudes in the forward direction from the driver main body 15. The pair of first protrusions 15*e* may be formed at a left and right end of the driver main body 15 in the left-right direction, respectively. The second protrusion 15*g* may be formed in an intermediate position between the pair of first protrusion 15*e* in the left-right direction. The pair of the first protrusion 15*e* and the second protrusion 15*g* may extend in the longitudinal direction (in the up-down direction in, for example, FIGS. 6 and 7) of the driver main body 15 and parallel to each other. As shown in, for example, FIG. 8, a recessed portion 15*f* may be formed between the first protrusion 15*e* and the second protrusion 15*g* and may be extend in a longitudinal direction of the driver main body 15.

The first protrusion 15*e* and the second protrusion 15*g* may have approximately a rectangular shape viewed from the driving direction. The first protrusion 15*e* may extend forward so as to have approximately the same thickness as the driving projection 16 in the front-rear direction. A protrusion length of the second protrusion 15*g* may be smaller than that of the first protrusion 15*e*.

As shown in FIGS. 6 and 7, a planar tip end surface 15*a* may be formed at a lower end of the second protrusion 15*g* of the driver main body 15. As shown in FIGS. 1 and 3, the tip end surface 15*a* may be disposed perpendicular to the up-down direction. The tip end surface 15*a* of the driver main body 15 may drive a head portion of the driving member N. A center of the tip end surface 15*a* in the left-right direction may drive a driving center of the driving member N in the left-right direction. The second protrusion 15*g* may extend forward at approximately the same length as the head portion of the driving member N.

As shown in FIGS. 3, 6 and 7, the driver main body 15 may include a connection portion 15*b* at an upper portion of the driver main body 15. The connection portion 15*b* may be connected to a connection portion 14*a* of piston 14. A circular through hole 15*d*, which penetrate the connection portion 15*b* in a direction perpendicular to a surface of the connection portion 15*b* (in a front-rear direction in FIG. 6), may be formed in the middle of the connection portion 15*b*. A cylindrical connection pin 17 may be press-fit to the through hole 15*d* such that the connection pin 17 protrudes from the surfaces of the connection portion 15*b* in the front-rear direction. A center of the through hole 15*d* (an axis center of the connection pin 17) may be a rotation center 15*c* of the driver main body 15 with respect to the piston 14. As clearly shown in FIG. 7, the rotation center 15*c* of the driver main body 15 may be on a right side of a width center line K of the driver main body 15 in the left-right direction. Also, the rotation center 15*c* of the driver main body 15 may be on a width center line L of the piston 14 in the left-right direction.

As shown in FIGS. 1 and 3, the piston 14 may include the connection portion 14*a* that is connected to the connection portion 15*b* of the driver main body 15. The connection portion 14*a* may include a driver insertion groove 14*c*. The driver main body 15 may be inserted to the driver insertion groove 14*c* from an opening of a lower portion of the connection portion 14*a*. The driver insertion groove 14*c* may have an opening width that is a little longer than a thickness of the connection portion 15*b* of the driver main body 15 in the front-rear direction. A lower opening of the driver insertion groove 14*c* may have a longer width than the connection portion 15*b* in the left-right direction such that the driver main body 15 can be swingable within a predetermined range in the left-right direction.

As shown in FIGS. 1 and 3, the connection portion 14*a* of the piston 14 may include a circular through hole 14*b* that penetrates the connection portion 14*a* in the front-rear direction. The through hole 14*b* may intersect and communicate with the driver insertion groove 14*c*. The through hole 14*b* may be formed such that the connection pin 17 can be inserted into the through hole 14*b*. A center of the through hole 14*b* may be on the width center line L of the piston in the left-right direction. The connection pin 17 may protrude from the surfaces of the connection portion 15*b* of the driver main body 15 in the front-rear direction. The protrusion portion of the connection pin 17 may be inserted into the through hole 14*b* of the piston 14 in the front-rear direction. Because of this configuration, the connection pin 17 may be supported by the connection portion 14*a* so as to be rotatable in the through hole 14*b*. The connection pin 17 may rotate around the rotation center 15*c* integrally with the driver main body 15. The piston 14 may include a damper-receiving surface 14*d* radially outside of the connection portion 14*a* in a lower portion of the piston 14. The damper-receiving surface 14*d* may be formed in approximately a plane shape in a direction perpendicular to the up-down direction.

As shown in FIGS. 1 to 4, a damper 18 (cushion) may be arranged on a lower side of the cylinder 12. The damper 18 may absorb an impact of the piston 14 at a lower end of the piston 14. The damper 18 may be made of, for example, a synthetic rubber such as polyurethane rubber or elastic member such as a synthetic resin. The damper 18 may be formed in approximately a tubular shape. The damper 18 may include a through hole 18*a* in the middle of the damper 18. The through hole 18*a* may penetrate the damper 18 in the up-down direction. An inner circumferential surface of the through hole 18*a* may be in a circular shape when viewed in the driving direction (in the up-down direction). The driver 30 may pass through the through hole 18*a*. The through hole 18*a* of the damper 18 may be configured to have a diameter such that the driver 30 may not contact the damper 18 when the driver 30 moves between a lower end position and an upper end position. The damper 18 may be arranged such that a center of the through hole 18*a* in the left-right direction and in the front-rear direction is on the width center line L of the piston 14. A width of the damper 18 in the left-right direction may be approximately the same as a width of the damper 18 in the front-rear direction. Therefore, the damper 18 may contact the damper-receiving surface 14*d* of the piston 14 uniformly in the left-right direction and in the front-rear direction.

As shown in FIG. 3, a thickness of the damper 18 in the left-right direction may be such that a thickness on a right side of the driver 30, which faces the driving projection 16, is approximately the same as a thickness on a left side of the driver 30, which does not face the driving projection 16. In order to increase a volume of the damper 18 that contacts the piston 14, a thickness of the damper 18 on the left side of the driver 30 can be made thicker than that on the right side of the driver 30. However, symmetric property of the damper 18 in the left-right direction may be low in such a configuration. Because of the low symmetry of the damper 18 in the left-right direction, it may be possible that the piston 14 is tilted in the left-right direction when the piston 14 contacts the damper 18. Furthermore, repeated driving operations while the piston 14 is tilted may cause both an inner peripheral surface of the piston 14 and an inner peripheral surface of the cylinder 12 to wear. Similarly, when symmetric property of the damper 18 in the front-rear direction is low, the piston 14 may be tilted in the front-rear direction, thereby causing both the inner peripheral surfaces of the piston 14 and the cylinder 12 to wear. Accordingly, it may be preferable that the damper 18 has a high symmetric property in the left-right direction and in the front-rear direction. For example, it may be preferable that the damper 18 hay have a tubular shape or a regular polygonal cylindrical shape.

As shown in FIGS. 3 and 4, a guide member 19 may be arranged below the damper 18 and on a left side of the lift mechanism 20. The guide member 19 may guide the driver 20 in the up-down direction. The guide member 19 may be long in the up-down direction. A left side wall of the driver main body 15, from which the driving projections 16 do not extend, may be guided in the driving direction by a right side wall of the guide member 19. A left and right side wall 2*b* of the driving passage 2*a* may be arranged symmetrically in the left-right direction with respect to a width center line M of the driving nose 2. A left side wall of the driver main body 15 that moves downward may be guided in the driving direction by the side wall 2*b*. The driver main body 15 may be guided such that a width center line K of the driver main body 15 is coaxial with a width center line M of the driving nose 2. The driving member N may be supplied to the driving passage 2*a* such that an upper driving center of the driving member N is disposed on the width center line M of the driving nose 2. Because of this configuration, the driving center of the driving member N may be coaxial with the width center line K of the driver main body 15.

As shown in FIGS. 3 and 4, the width center line K of the driver main body 15 may be offset in the leftward direction away from the lift mechanism 20 with respect to the width center line L of the piston 14. The width center line K of the driver main body 15 may be parallel to the width center line L of the piston 14 when the driver main body 15 is not tilted in the left-right direction. A distance between the width center line K and the width center line L in the left-right direction may be configured to be, for example, less than 40%, 30% or 20% of a length of the driving projection 16. Also, the distance may be configured to be, for example, more than 5% or 10% of the length of the driving projection 16. Furthermore, the distance may be, for example, less than a length of the second protrusion 15*g* in the left-right direction.

Next, a sequence of a driving operation of the driving tool 1 will be discussed below. FIG. 3 shows an embodiment of a standby state in which the piston 14 and the driver 30 are in an initial position. The piston 14 and the driver 30 in the initial position may be held slightly below the upper end position. In this standby state, a last engaging portion 24*b*, which is disposed forwardly (upwardly) adjacent to the recessed portion 22*d*, may engage a bottom portion of a lowermost driving projection 16 (a first driving projection 16 from a lower side in the driving direction).

When the contact arm 3 is in the upward position by being pushed by a workpiece W and the trigger 5 is in the pulled position when the piston 14 is in the standby state, the trigger switch 5*a* may be in an on state and the electric motor 26 may be activated. When the electric motor 26 is activated, the wheel 22 may rotate, for example, in a counterclockwise direction in FIG. 3. The last engaging portion 24*b* may move the lowermost driving projection 16 in an upward direction. The piston 14 and the driver 30 may move from the initial position to the upper end position. When the driver 30 reaches the upper end position, a driving member N may be supplied from the magazine to the width center line M in the driving passage 2*a*. When the driver 30 reaches the upper end position and the wheel 22 further rotates, the last engaging portion 24*b* may disengage from the bottom portion of the driving projection 16. As a result, the piston 14 and the driver 30 may move downward owing to the gas pressure. The driver main body 15 may move downward in a manner such that the width center line K of the driver main body 15 is on the width center line M of the driving nose 2, thereby driving one driving member N with the tip end surface 15*a*.

While the driver 30 moves downward, the recessed portion 22*d* of the wheel 22 may be disposed in or adjacent to the driving passage 2*a*. Correspondingly, all of the engaging portions 24 of the wheel 22 may have been moved out of (retreated from) the driving passage 2*a*. Therefore, interference between the engaging portions 25 and the driving projections 16 may be prevented, allowing for the smooth performance of a driving operation.

As shown in FIG. 4, after the driving member N has been driven, e.g., the driver 30 has reached a lower end position, the wheel 22 may continue to rotate, for example, in the counterclockwise direction. The first engaging portion 24*a*, which is disposed rearwardly adjacent to the recessed portion 22*d*, may engage a bottom portion of an uppermost driving projection 16 of the driver 30. Because of this configuration, the piston 14 and the driver 30 may start to move upward in a direction opposite to the driving operation. In other word, the position 14 and the driver 30 may start a returning operation. When this returning operation starts, the wheel 22 may be biased by the compression spring 23 toward the initial position of the wheel 22, i.e., toward the driver 30 (toward the left side in FIG. 4). Thus, the center 22*c* of the wheel 22 may be on the motor axis line J.

The wheel 22 may continue to rotate from a state in which the driver 30 is at the lower end position shown in FIG. 4 to a state in which the driver 30 is at the initial position shown in FIG. 3. Each of the engaging portions 24 may successively engage a bottom portion of a corresponding driving projection 16. The driver 30 and the piston 14 may move upward against the gas pressure in the accumulation chamber 13. In an upward movement of the driver 30 and the piston 14, there may be a state where the engaging portion 24 is pushed rightward by the driving projection 16 such that the wheel 22 moves radially rightward with respect to the shaft member 21. However, the wheel 22 and the driver 30 may be configured such that, before the last engaging portion 24*b* of the wheel 22 engages a bottom portion of the lowermost driving projection 16, the piston 14 and the driver 30 are positioned in the initial position. The electric motor 26 (refer to FIG. 1) may stop when the driver 30 and the piston 14 reaches the initial position, for example, by accurate control of an amount of time that has passed since activation of the electric motor 26. A sequence of the driving operation may be completed when the driver 30 and the piston 14 return to the initial position. The initial position of the piston 14 and the driver 30 may be configured to be slightly below the upper end position of the piston 14 and the driver 30. In this manner, after the driver 30 moves upward from the initial position to the upper end position, the driver 30 may move downward owing to the gas pressure, thereby performing a driving operation.

As discussed above, the driving tool 1 may include the cylinder 12 and the piston 14 that moves in the cylinder 12 owing to the gas pressure, as shown in FIGS. 3 and 4. The driving tool 1 may include the driver main body 15 that moves integrally with the piston 14 so as to drive the driving member N. The driving tool 1 may include the plurality of driving projections 16 that project from the driver main body 15 in the width direction of the driver main body 15. The plurality of driving projections 16 may be arranged along a side edge of the driver main body 15 in a longitudinal direction of the driver main body 15. The driving tool 1 may include the lift mechanism 20 that includes the wheel 22 with the plurality of engaging portions 24 that engage a corresponding driving projection 16. The lift mechanism 20 may be configured such that the driver main body 15 returns to the initial position by rotation of the wheel 22. The driving tool 1 may include the tubular damper 18 for receiving an impact of the piston 14, the tubular damper 18 having the through hole 18*a* through which the driver main body 15 passes. The driver main body 15 may be arranged such that the width center line K of the driver main body 15 is offset in a direction away from the lift mechanism 20 (in the leftward direction) with respect to the width center line L of the piston 14.

Because of this configuration, a length between a tip end of the driving projection 16 and the width center line L of the piston 14 in the left-right direction may be shortened by such a distance that the width center line K of the driver main body 15 is offset with respect to the width center line L of the piston 14. Accordingly, an opening area of the through hole 18*a* of the damper 18, through which the driver main body 15 and the driving projections 16 pass, may be reduced by that much. Thus, a volume of the damper 18 that contacts the damper-receiving surface 14*d* of the piston 14 may be increased. As a result, shock absorbability of the damper 18 may be improved. Also, durability of the damper 18 and the piston 14 that contact to each other may be improved.

As shown in FIGS. 3 and 4, the driver main body 15 may be connected to the piston 14 so as to be swingable in the width direction of the driver main body 15. Accordingly, the driver main body 15 may be swingable around a connection portion 15*b* of the driver main body 15 connected to the piston 14 within a predetermined angle range in the width direction of the driver main body 15. Because of this configuration, a situation in which the driver main body 15 slides the driving nose 2 that guides the driver main body 15 can be quickly avoided by a swing of the driver main body 15 in the width direction of the driver main body 15. Accordingly, an accidental force may be restrained from applying to the driver main body 15, thereby suppressing wear of the driver main body 15.

As shown in FIGS. 3 and 4, the swing center 15*c* of the driver main body 15 with respect to the piston 14 may be on the width center line L of the piston 14. Accordingly, the driver main body 15 may be swingable with respect to the width center line L of the piston 14 uniformly in the width direction of the driver main body 15 (in the left-right direction). The damper 18 may be arranged approximately uniformly around the width center line L of the piston 14 such that the damper 18 uniformly contacts the damper-receiving surface 14*d* of the piston 14. Because of this configuration, the driver main body 15 may be swingable approximately uniformly in the width direction of the driver main body 15 with respect to the center of the damper 18. Accordingly, when the driver main body 15 swings in the width direction of the driver main body 15, the driver main body 15 and the driving projections 16 may be prevented from accidentally contacting the inner circumferential surface of the damper 18.

As shown in FIGS. 3 and 4, the driving tool 1 may include the driving nose 2 (a driver guide) on a lower side in the driving direction, which is configured to guide the driver main body 15. The driving nose 2 may be arranged such that the width center line M of the driving nose 2 is offset in a direction away from the lift mechanism 20 with respect to the width center line L of the piston 14. The driver main body 15 may move in the driving direction such that the width center line K of the driver main body 15 is on the width center line M of the driving nose 2. The driving member N may be supplied on the width center line M of the driving nose 2. Accordingly, the driver main body 15 may drive approximately a center of the driving member N in the width direction of the driving member N. As a result, the driving member N may be ejected straight in the driving direction.

As shown in FIGS. 1 to 4, the inner circumferential surface of the through hole 18*a* of the damper 18 may have a circular shape viewed from a movement direction of the driver main body 15. Accordingly, the piston 14 may contact the damper 18 approximately uniformly in a circumferential direction. When the damper 18 receives an impact from the piston 14, the damper 18 may be deformed approximately uniformly in the circumferential direction. As a result, a specific portion of the damper 18 may be suppressed from wearing, thereby improving durability of the damper 18. Also, when the piston 14 contacts the damper 18, the piston 14 may be prevented from accidentally tilting, thereby suppressing both the piston 14 and the cylinder 12 from wearing.

As shown in FIGS. 3 and 4, the lift mechanism 20 may include the wheel 22 rotatably supported by the tool main body 10. Also, the lift mechanism 20 may include the plurality of engaging portions 24 arranged in a circumferential direction of the wheel 22. The wheel 22 may be configured to move in a radial direction of the wheel 22 such that at least one of the plurality of engaging portions 24 is moved away from the driver main body 15.

Because of the above configuration, a projecting length of the driving projection 16 in the width direction may be required to be longer by a length such that the engaging portion 24 moves in the radial direction of the wheel 22. The width center line K of the driver main body 15 is arranged to be offset in the leftward direction away from the lift mechanism 20 with respect to the width center line L of the piston 14. A volume of the damper 18 therefore may not be reduced when a projecting length of the driving projection 16 is longer. Also, the wheel 22 and accordingly the engaging portions 24 can be positioned nearer to the width center line L of the piston 14 by such a length that the width center line K of the driver main body 15 is offset with respect to the width center line L of the piston 14. Thus, an upward pressing force applied to a bottom portion of the driving projection 16, which is caused by the engaging portion 24, may act near to the width center line L of the piston 14. As a result, the driver 30 and the piston 14 may move straight upward.

Figure 8:
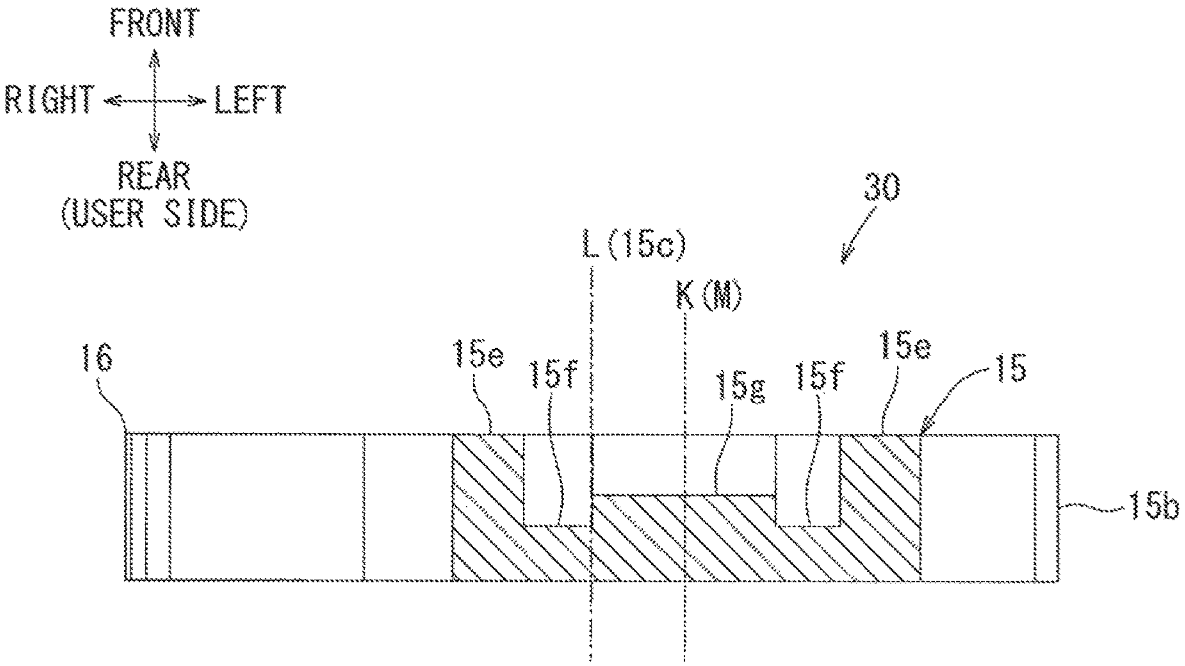
FIG. 8 is a cross-sectional view taken along line VIII-VIII of FIG. 7.

As shown in FIGS. 6 to 8, the driver main body 15 may include the first protrusions 15*e* on both sides of the width direction of the driver main body 15. Also, the first protrusions 15*e* may protrude in a height direction perpendicular to both a moving direction of the driver main body 15 and the width direction of the driver main body 15. The first protrusion 15*e* of the driver main body 15 may be guided along, for example, the guide member 19, thereby moving the driver main body 15 straight in the driving direction. As a result, the driver main body 15 may stably drive the driving member N (refer to FIGS. 3 and 4) straight in the driving direction in an improved manner.

As shown in FIGS. 6 to 8, the driver main body 15 may include the second protrusion 15*g* in the middle of the width direction of the driver main body 15. The second protrusion 15*g* may protrude in the height direction. The protrusion length of the second protrusion 15*g* may be smaller than that of the first protrusions 15*e*. By suppressing the height of the second protrusion 15*g*, the driver main body 15 may be made lighter. The driver main body 15 may drive the driving member N (refer to FIGS. 3 and 4) at the tip end surface 15*a* formed at a lower end of the second protrusion 15*g* of the driver main body 15. By providing the second protrusion 15*g* such that the protrusion length of the second protrusion 15*g* is formed to have a predetermined length, the driving member N driven by the driver main body 15 may be properly ejected in a stable manner.

The embodiment of the present disclosure discussed above may be modified in various ways. In the above-exemplified embodiment, the lift mechanism 20 may be arranged on a right side of the driver 20. However, instead of this arrangement, for example, the lift mechanism 20 may be arranged on a left side of the driver 30. In this case, the width center line K of the driver main body 15 may be shifted on a right direction with respect to the width center line L of the piston 14.

In the above-exemplified embodiment, the driving tool 1 may include a wheel 22 having eight engaging portions 24 and a driver 30 having eight driving projections 16. However, the number of the engaging portions 24 and the driving projections 16 may not be limited to eight. The number of the engaging portions 24 and the driving projections 16 may be properly set according to, for example, a stroke of the driver 30, a size of the tool main body 10 or any other factors. Furthermore, an interval length between the engaging projections 24 in the circumferential direction of the wheel 24 may be modified as needed. Also, an interval length between the driving projections 16 of the driver main body 15 in the up-down direction may be modified as needed.

In the above-exemplified embodiment, a pin-shaped engaging portions 24 may be used. However, the engaging portions 24 may be in a pinion tooth shape formed along an outer peripheral edge of the wheel 22. In the above-exemplified embodiment, the lift mechanism 20 may be such that the wheel 22 moves radially with respect to the shaft member 21. However, the driver 30 and the piston 14 may be adopted to a driving tool 1 that includes a lift mechanism 20 in which the wheel 22 does not move radially with respect to the shaft member 21. In the above-exemplified embodiment, the plurality of driving projections 16 may each have approximately a triangular shape viewed from a front-rear direction, and each of the driving projections 16 may have the same projecting length. However, a shape and a projecting length of the driving projection 16 may be modified as needed. For example, a shape and a projecting length may be modified for each driving projection 16.

In the above-exemplified embodiment, a damper 18 may be approximately a tubular shape and an inner circumferential surface of the through hole 18*a* may be in a circular shape when viewed in the up-down direction. Instead of this configuration, a damper 18 may have a regular polygonal cylindrical shape, and an inner circumferential surface of the through hole 18*a* may be in a regular polygonal cylindrical shape similarly to an outer circumferential surface of the through hole 18*a*. Alternatively, a damper 18 may be in a regular polygonal cylindrical shape and an inner circumferential surface of the through hole 18*a* may be in a circular shape. In addition, a recessed portion may be formed on an inner circumferential surface of the through hole 18*a* of the damper 18 such that the recessed portion for avoiding an interference of the driving portions 16 with the through hole 18*a* is formed only in an area where the driving projections 16 passes. In this case, a shape of an inner circumferential surface of the through hole 18*a* may be approximately in a circular shape viewed in the up-down direction, except the recessed portion (a notched portion) extending radially outward from the circular portion of the inner circumferential surface of the through hole 18*a*. The recessed portion may be formed to have a width that is slightly larger than the driving projection 16 in the circumferential direction of the inner circumferential surface of the through hole 18*a*. IN this manner in a case where the recessed portion is formed in the damper 18, a length of the recessed portion in a radial direction of the damper 18 can be shortened by offsetting the width center line K of the driver main body 15 in a direction opposite to a projecting direction of the driving projections 16 with respect to the width center line L of the piston 14.

What is claimed is:

1. A driving tool, comprising:
- a cylinder;
- a piston configured to move inside the cylinder in a driving direction owing to a gas pressure;
- a driver main body configured to drive a driving member by moving integrally with the piston;
- a plurality of driving projections configured to project from the driver main body in a width direction of the driver main body, the plurality of driving projections being arranged on a side edge of the driver main body in a longitudinal direction;
- a lift mechanism including a wheel having a plurality of engaging portions that engages a corresponding driving projection, the lift mechanism configured to drive the driver main body to return to an initial position by rotation of the wheel;
- a tubular damper configured to absorb an impact of the piston, the tubular damper including a through hole for the driver main body to pass through,
- wherein the driver main body is arranged such that a width center line of the driver main body is offset in a direction away from the lift mechanism with respect to a width center line of the piston, and
- wherein the driver main body connected to the piston is configured to be swingable in the width direction of the driver main body.

2. The driving tool according to claim 1, wherein a swing center of the driver main body with respect to the piston is on the width center line of the piston.

3. The driving tool according to claim 1, further comprising:
- a driver guide arranged on a lower side in the driving direction and configured to guide the driver main body,
- wherein the driver guide is arranged such that a width center line of the driver guide is offset in a direction away from the lift mechanism with respect to the width center line of the piston.

4. The driving tool according to claim 3, the width center line of the driver guide is aligned with the width center line of the driver main body.

5. The driving tool according to claim 1, wherein an inner circumferential surface of the through hole of the damper is configured in a circular shape viewed from a movement direction of the driver main body.

6. The driving tool according to claim 1, wherein:
- the wheel is rotatably supported by a tool main body of the driving tool and the plurality of engaging portions are arranged in a circumferential direction of the wheel; and
- the wheel is configured to be movable in a radial direction of the wheel such that at least one of the plurality of engaging portions is moved away from the driver main body.

7. The driving tool according to claim 1, wherein the driver main body further includes a pair of first protrusions arranged on a left end and right end of the driver main body.

8. The driving tool according to claim 7, wherein the driver main body further includes a second protrusion disposed in an intermediate position between the pair of the first protrusions, a protrusion length of the second protrusion being less than that of the pair of the first protrusions.

9. The driving tool according to claim 7, wherein each of the pair of the first protrusions protrudes in a height direction perpendicular to both a movement direction of the driver main body and the width direction of the driver main body.

10. The driving tool according to claim 1, wherein the through hole of the tubular damper is configured to have a diameter for the driver main body passing through without contacting the damper.

11. The driving tool according to claim 1, wherein the piston further includes a connection portion for connecting the driver main body, the connection portion further including a driver insertion groove to be inserted by the driver main body.

12. The driving tool according to claim 11, wherein the driver main body further includes a connection portion located at an upper portion of the driver main body and connected to the connection portion of the piston.

13. The driving tool according to claim 12, wherein the driver insertion groove includes a lower opening having a longer width than the connection portion of the driver main body such that the driver main body is swingable within a predetermined range in the width direction of the driver main body.

14. The driving tool according to claim 13, wherein the connection portion of the piston further includes a circular through hole that penetrates the connection portion of the piston, a center of the circular through hole configured to be on the width center line of the piston.

15. The driving tool according to claim 14, wherein the circular through hole of the piston intersects and communicate with the driver insertion groove.

16. The driving tool according to claim 15, wherein:

the connection portion of the driver main body includes a through hole in a middle of the connection portion;

a connection pin is press-fit to the through hole of the driver main body, the connection pin protruding from both surfaces of the connection portion of the driver main body; and the protruding portion of the connection portion is inserted into the through hole of the piston, such that the connection pin is supported by the connection portion of the piston so as to be rotatable in the through hole of the piston.

17. A driving tool, comprising:

a cylinder;

a piston configured to move inside the cylinder in a driving direction owing to a gas pressure;

a driver main body configured to drive a driving member by moving integrally with the piston;

a plurality of driving projections configured to be formed integrally with the driver main body and project from the driver main body in a width direction of the driver main body, each of the plurality of driving projections being arranged on a side edge of the driver main body in a longitudinal direction and forming in a shape of rack tooth having a bottom portion that faces in the driving direction;

a lift mechanism including a wheel having a plurality of engaging portions that engages a corresponding driving projection, the lift mechanism configured to drive the driver main body to return to an initial position by rotation of the wheel;

a tubular damper configured to absorb an impact of the piston, the tubular damper including a through hole for the driver main body to pass through, wherein the driver main body is arranged such that a width center line of the driver main body is offset in a direction away from the lift mechanism with respect to a width center line of the piston.

18. The driving tool according to claim 17, wherein the driver main body connected to the piston is configured to be swingable in the width direction of the driver main body.

19. The driving tool according to claim 17, wherein a swing center of the driver main body with respect to the piston is on the width center line of the piston.

20. The driving tool according to claim 17, wherein:

the wheel is rotatably supported by a tool main body of the driving tool and the plurality of engaging portions are arranged in a circumferential direction of the wheel; and the wheel is configured to be movable in a radial direction of the wheel such that at least one of the plurality of engaging portions is moved away from the driver main body.

* * * * *